United States Patent
Mujeeb et al.

(10) Patent No.: US 11,902,398 B2
(45) Date of Patent: Feb. 13, 2024

(54) SYSTEM AND METHOD TO INTEGRATE DATA FROM ONE APPLICATION TO ANOTHER APPLICATION

(71) Applicant: Bizdata Inc., Wilmington, DE (US)

(72) Inventors: Adil Mujeeb, Cupertino, CA (US); Ritesh Khapre, Bangalore (IN)

(73) Assignee: Bizdata Inc., Wilmington, DE (US)

( * ) Notice: Subject to any disclaimer, the term of this patent is extended or adjusted under 35 U.S.C. 154(b) by 290 days.

(21) Appl. No.: 17/353,881

(22) Filed: Jun. 22, 2021

(65) Prior Publication Data

US 2022/0407926 A1    Dec. 22, 2022

(51) Int. Cl.
| | |
|---|---|
| H04L 67/00 | (2022.01) |
| H04L 67/565 | (2022.01) |
| G06F 11/07 | (2006.01) |
| G06N 20/00 | (2019.01) |
| G06F 21/44 | (2013.01) |
| G06F 21/64 | (2013.01) |
| G06F 40/20 | (2020.01) |

(52) U.S. Cl.
CPC ........ *H04L 67/565* (2022.05); *G06F 11/0766* (2013.01); *G06F 21/44* (2013.01); *G06F 21/64* (2013.01); *G06F 40/20* (2020.01); *G06N 20/00* (2019.01); *H04L 67/34* (2013.01)

(58) Field of Classification Search
None
See application file for complete search history.

(56) References Cited

U.S. PATENT DOCUMENTS

| | | | |
|---|---|---|---|
| 9,811,394 B1 | 11/2017 | Kogias et al. | |
| 10,380,342 B2 | 8/2019 | De | |
| 2006/0163338 A1* | 7/2006 | Allen | A01K 11/008 705/29 |

(Continued)

FOREIGN PATENT DOCUMENTS

WO    2020081949 A1    4/2020

OTHER PUBLICATIONS

Jitterbit; https://www.jitterbit.com/platform/ipaas.
Mulesoft; https://blogs.mulesoft.com/bloghome/.

*Primary Examiner* — Tuankhanh D Phan
(74) *Attorney, Agent, or Firm* — Jason C. Cameron

(57) ABSTRACT

A system to integrate data from one application to another application is disclosed. The plurality of subsystems includes a user command capturing subsystem, configured to capture commands from a user. The plurality of subsystems includes an application integration subsystem, configured to analyse the captured commands of the user corresponding to the source application and the target application based on a set of parameters. The application integration subsystem obtains a source response and a target response and extract source application attributes and target application attributes. The plurality of subsystems includes an application attribute mapping subsystem, configured to generate an application attribute map from the source application attributes and the target application attributes by implementation of artificial intelligence-based Natural Language Processing (NLP). The application attribute mapping subsystem establishes a data transmission channel between the source application and the target application and transmit data through the data transmission channel.

15 Claims, 5 Drawing Sheets

(56) References Cited

U.S. PATENT DOCUMENTS

2018/0052897 A1\* 2/2018 Namarvar ............. G06F 3/0482
2019/0132264 A1 5/2019 Ali et al.
2021/0342545 A1\* 11/2021 Avshalomov ......... G06F 16/248

\* cited by examiner

SYSTEM AND METHOD TO INTEGRATE DATA FROM ONE APPLICATION TO ANOTHER APPLICATION

FIELD OF INVENTION

Embodiments of a present disclosure relates to management process of networked applications, and more particularly to a system and a method to integrate data from one application to another application.

BACKGROUND

Applications have fundamentally changed every aspect of our lives. The truth is technology has seamlessly integrated its way into our day-to-day activities, improving and streamlining them. Applications may be distinguished into social apps, work apps, play apps and the like. And every application may or may not be dependent on each other for proper functioning.

For proper functioning of few applications, data needs to be transported from another application to them. Techniques such as data integration, data analytics, data augmentation, business process re-engineering or data flow automation is only possible with proper data transportation.

In conventional approach, a human developer writes a program to integrate source applications and target applications with above stated techniques. Such process is time taking and error prone. An automated system should be designed to help integration of two application with generation of easy data transmission path. Such stated process will require no or low level of human intervention.

In conventional approach another problem was requirement of expert technical manpower and time-consuming instalment of technical software components on local client machine as well as on the servers. Any automated system will efficiently use artificial intelligence model to remove the earlier known costly and time-consuming integration processes.

Hence, there is a need for an improved system to integrate data from one application to another application, and a method to operate the same and therefore address the aforementioned issues.

SUMMARY

In accordance with one embodiment of the disclosure, a system to integrate data from one application to another application is disclosed. The system to integrate data from one application to another application includes a hardware processor. The system to integrate data from one application to another application also includes a memory coupled to the hardware processor. The memory comprises a set of program instructions in the form of a plurality of subsystems. The plurality of subsystems is configured to be executed by the hardware processor. The plurality of subsystems includes a user command capturing subsystem. The user command capturing subsystem is configured to capture commands from a user.

The plurality of subsystems also includes an application integration subsystem. The application integration subsystem is configured to analyse the captured commands of the user corresponding to the source application and the target application based on a set of parameters. The application integration subsystem is also configured to obtain a source response and a target response for each of the captured commands. The application integration subsystem is also configured to extract source application attributes and target application attributes from the obtained source response and target response.

The plurality of subsystems also includes an application attribute mapping subsystem. The application attribute mapping subsystem is configured to generate an application attribute map from the source application attributes and the target application attributes by implementation of artificial intelligence-based Natural Language Processing (NLP) algorithms. The application attribute mapping subsystem is also configured to establish a data transmission channel between the source application and the target application based on the generated application attribute map. The application attribute mapping subsystem is also configured to transmit data through the data transmission channel.

The plurality of subsystems also includes an exception handling subsystem. The exception handling subsystem is configured to detect anomaly in the transmitted data using machine learning algorithms. The exception handling subsystem is also configured to display detected anomaly in the form of a data transmission report on a user interface of the device.

In accordance with one embodiment of the disclosure, a method for integrating data from one application to another application is disclosed. The method includes capturing commands from a user. The method also includes analysing captured commands of the user corresponding to the source application and the target application based on a set of parameters. The method also includes obtaining a source response and a target response for each of the captured commands. The method also includes extracting source application attributes and target application attributes from the obtained source response and target response.

The method also includes generating an application attribute map from the source application attributes and the target application attributes by implementation of artificial intelligence-based Natural Language Processing (NLP) algorithms. The method also includes establishing a data transmission channel between the source application and the target application based on the generated application attribute map. The method also includes transmitting data through the data transmission channel. The method also includes detecting anomaly in the transmitted data using machine learning algorithms. The method also includes displaying detected anomaly in the form of a data transmission report on a user interface of the device.

To further clarify the advantages and features of the present disclosure, a more particular description of the disclosure will follow by reference to specific embodiments thereof, which are illustrated in the appended figures. It is to be appreciated that these figures depict only typical embodiments of the disclosure and are therefore not to be considered limiting in scope. The disclosure will be described and explained with additional specificity and detail with the appended figures.

BRIEF DESCRIPTION OF THE DRAWINGS

The disclosure will be described and explained with additional specificity and detail with the accompanying figures in which.

Figure 1:
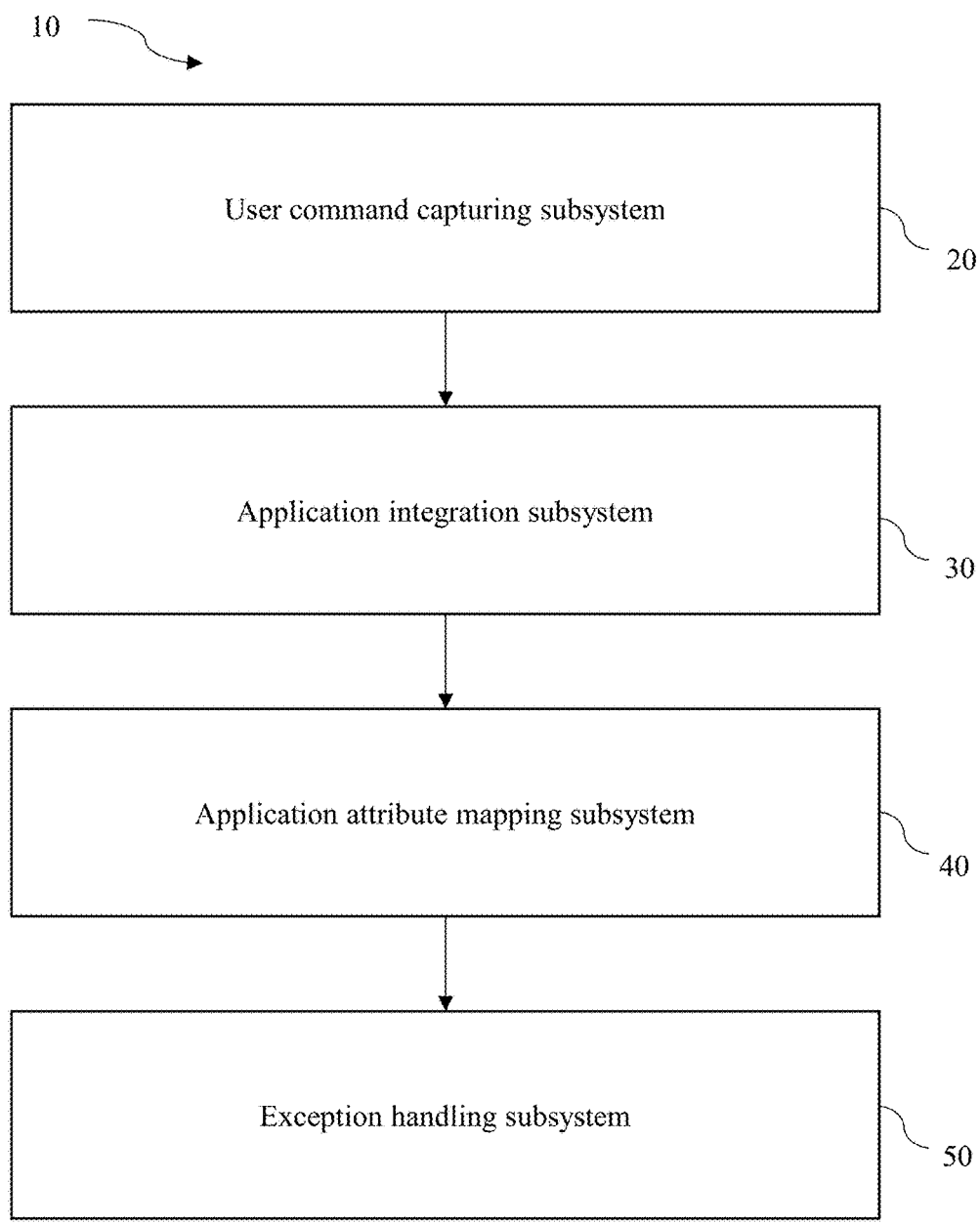
FIG. 1 is a block diagram illustrating an exemplary computing system to integrate data from one application to another application in accordance with an embodiment of the present disclosure.

Further, those skilled in the art will appreciate that elements in the figures are illustrated for simplicity and may not have necessarily been drawn to scale. Furthermore, in terms of the construction of the device, one or more components of the device may have been represented in the figures by conventional symbols, and the figures may show only those specific details that are pertinent to understanding the embodiments of the present disclosure so as not to obscure the figures with details that will be readily apparent to those skilled in the art having the benefit of the description herein.

DETAILED DESCRIPTION

For the purpose of promoting an understanding of the principles of the disclosure, reference will now be made to the embodiment illustrated in the figures and specific language will be used to describe them. It will nevertheless be understood that no limitation of the scope of the disclosure is thereby intended. Such alterations and further modifications in the illustrated online platform, and such further applications of the principles of the disclosure as would normally occur to those skilled in the art are to be construed as being within the scope of the present disclosure.

The terms "comprises", "comprising", or any other variations thereof, are intended to cover a non-exclusive inclusion, such that a process or method that comprises a list of steps does not include only those steps but may include other steps not expressly listed or inherent to such a process or method. Similarly, one or more devices or subsystems or elements or structures or components preceded by "comprises . . . a" does not, without more constraints, preclude the existence of other devices, subsystems, elements, structures, components, additional devices, additional subsystems, additional elements, additional structures or additional components. Appearances of the phrase "in an embodiment", "in another embodiment" and similar language throughout this specification may, but not necessarily do, all refer to the same embodiment.

Unless otherwise defined, all technical and scientific terms used herein have the same meaning as commonly understood by those skilled in the art to which this disclosure belongs. The system, methods, and examples provided herein are only illustrative and not intended to be limiting.

In the following specification and the claims, reference will be made to a number of terms, which shall be defined to have the following meanings. The singular forms "a", "an", and "the" include plural references unless the context clearly dictates otherwise.

A computer system (standalone, client or server computer system) configured by an application may constitute a "subsystem" that is configured and operated to perform certain operations. In one embodiment, the "subsystem" may be implemented mechanically or electronically, so a subsystem may comprise dedicated circuitry or logic that is permanently configured (within a special-purpose processor) to perform certain operations. In another embodiment, a "subsystem" may also comprise programmable logic or circuitry (as encompassed within a general-purpose processor or other programmable processor) that is temporarily configured by software to perform certain operations.

Accordingly, the term "subsystem" should be understood to encompass a tangible entity, be that an entity that is physically constructed permanently configured (hardwired) or temporarily configured (programmed) to operate in a certain manner and/or to perform certain operations described herein.

FIG. 1 is a block diagram illustrating an exemplary computing system 10 to integrate data from one application to another application in accordance with an embodiment of the present disclosure. In such embodiment, the applications include enterprise application (on-premises or SaaS), data warehouses, internet of things (IoT) and social media.

Functioning of each such application needs proper interaction of data associated with many other applications. In one embodiment, data associated of such applications are in format of JavaScript Object Notation (JSON), Extensible Mark-up Language (XML), Comma Separated Values (CSV), Tab Separated Values (TSV) and the like. In such embodiment, the transportation carrier is either of Hypertext Transfer Protocol (HTTP), File Transfer Protocol (FTP), Transmission Control Protocol (TCP), Internet Control Message Protocol (ICMP) or different protocols of same nature.

The system 10 to integrate data from one application to another application provides a channel for easy transportation of such data within applications. In one embodiment, the system 10 to integrate data from one application to another application uses a virtual assistant bot to act as a communication interface between the source and target application. The virtual assistant bot establishes the data communication channel.

Figure 3:
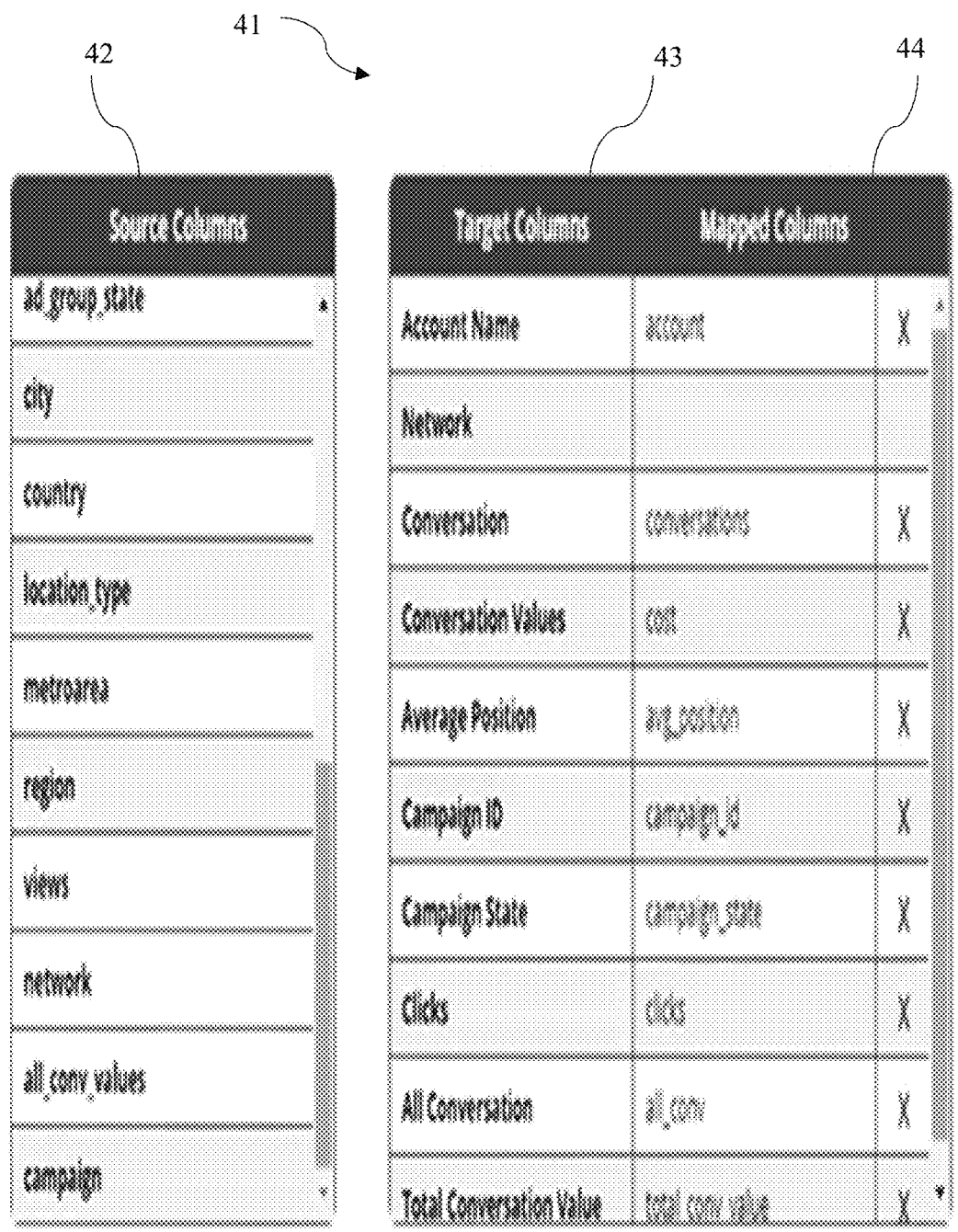
FIG. 3 is a tabular column illustrating an attribute mapping process in accordance with an embodiment of the present disclosure.

The system 10 to integrate data from one application to another application includes a hardware processor 120. The system 10 to integrate data from one application to another application also includes a memory 100 coupled to the hardware processor 120. The memory 100 comprises a set of program instructions in the form of a plurality of subsystems. The plurality of subsystems is configured to be executed by the hardware processor 120. (as shown in FIG. 3)

The plurality of subsystems includes a user command capturing subsystem 20. The user command capturing subsystem 20 is configured to capture commands from a user. The captured commands are associated with source application and target application. In one embodiment, the commands of the user comprise voice commands and text input commands. In another embodiment, the voice commands from the user comprises commands representative of source and target application authentication process and credentials. In an exemplary embodiment, the user command capturing subsystem 20 asks the end user via voice command, a pre-decided questions to configure source and target application definition such as for example, business object that needs to be integrated, credentials or API tokens of data source or data target applications. The user command capturing subsystem 20 uses the user inputs to configure the data source and data target information. In yet another embodiment, the user is referred to the customer intending to use the system 10 and create a data transportation channel between two applications (host application and target application).

The plurality of subsystems also includes an application integration subsystem 30. The application integration subsystem 30 is configured to analyse the captured commands of the user corresponding to the source application and the target application based on a set of parameters. In such embodiment, the set of parameters comprises authentication method, object name, token key and credentials.

For example, a client or a user wishes to transfer data in between application of two systems within the organization. The system 10 via the application integration subsystem 30 analyses authentication method of both the systems, source and target application object names, token key and credentials.

The application integration subsystem 30 is also configured to obtain a source response and a target response for each of the captured commands. In such embodiment, for obtaining a response, the application integration subsystem 30 is configured to trigger the source application and the target application for response. And lastly, the application integration subsystem receives the source response and the target response due to the trigger. In one specific embodiment, a data is extracted through HTTP protocol like REST API/SOAP API or thorough Database connection. In such embodiment, these data extraction from source system is called the response.

Simultaneously, the application integration subsystem 30 is also configured to extract source application attributes and target application attributes from the obtained source response and target response. In such embodiment, the source application attributes, and the target application attributes include asset ID, cost centre, application status, application owner and the like.

The plurality of subsystems also includes an application attribute mapping subsystem 40. The application attribute mapping subsystem 40 is also configured to generate an application attribute map from the source application attributes and the target application attributes by implementation of artificial intelligence-based Natural Language Processing (NLP) algorithms. The generated attribute map represents a dynamic relation between the source application and the target application. The stated attribute mapping is like "match the following".

In such embodiment, the generation of application attribute map comprises correlation or matching of source application attributes and target application attributes based on natural language processing rules and historical maps of existing applications. Such correlation generates application attribute map for the source application and the target application.

The application attribute mapping subsystem 40 is configured to establish a data transmission channel between the source application and the target application based on the generated application attribute map. And lastly, transmits data through established data transmission channel.

It is pertinent to note that the plurality of subsystem via an exception handling subsystem 60 detects anomaly in the transmitted data using machine learning algorithms. The system 10 to integrate data from one application to another application displays detected anomaly in the form of a data transmission report on a user interface of the device. In one specific embodiment, using past errors and associated resolutions, machine learning algorithm will report out data transmission error as well as suggested methods to heal the data error. The report generated will be in any presentable format. In another specific embodiment, anomaly is detected based on time series data. In such embodiment, several rule types are used for detecting anomalies. Some of the rules types are "Match where there are X events in Y time" (frequency type), "Match when the rate of events increases or decreases" (Spike type), "Match when there are less than X events in Y time" (flatline type), "Match when a certain field matches a blacklist/whitelist" (blacklist and whitelist type), "Match on any event matching a given filter" (any type), "Match when a field has two different values within some time" (change type). In an embodiment, if the data transportation is not happening between two systems this means transactions are failing which in return give errors such as attribute mapping errors, data type errors from application, wrong authentication errors in case of password changes, error on HTTP like anything other HTTP 200 OK code. Based on all the likely occurrence of errors between any two systems is easy to determine and this is how the frequency type, spike type, flat-line type rules are identified. If there is a flat line of error, this means the occurrence of error is constant. If the error occurrence is intermittent, then it falls in the count of frequency rule. There can be error that can happen because of anomaly in the dataset for such error, it shall fall in bucket of spike type which includes sudden hike in data changes or sudden dip in data changes this can be related to data volume or network bandwidth or nature of data.

Figure 2:
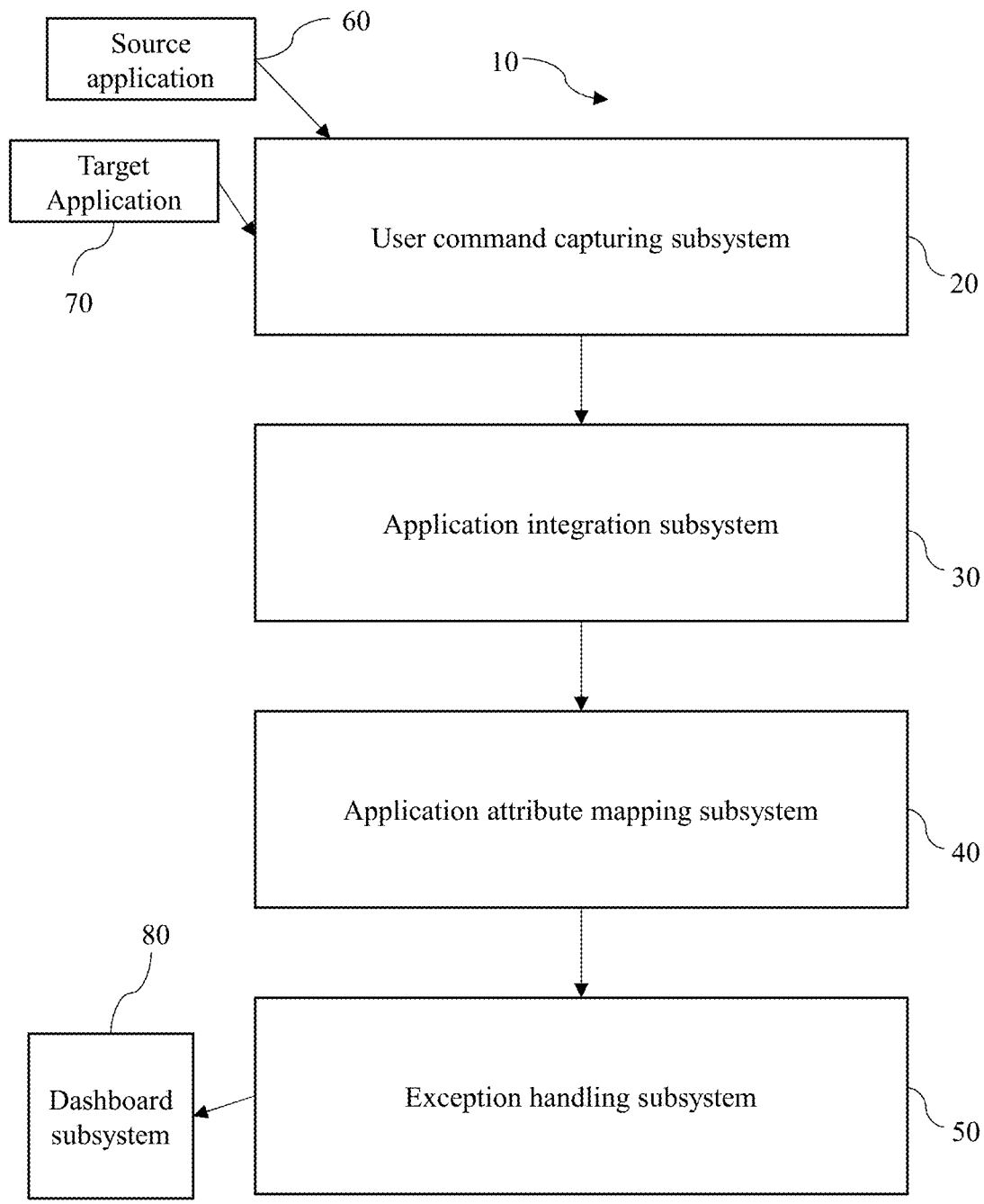
FIG. 2 is a block diagram illustrating an exemplary computing system to integrate data from one application to another application in accordance with an embodiment of the present disclosure.

Furthermore, the plurality of subsystems further comprises a dashboard subsystem 80 (as shown in FIG. 2). The dashboard subsystem 80 is configured to control functioning and performance of the data transmission channel based on commands of the user. Some of the functions like START, STOP, HOLD, DELETE will control the data transfer between the source application and the target application.

FIG. 2 is a block diagram illustrating an exemplary system 10 to integrate data from one application to another application in accordance with an embodiment of the present disclosure. In the given example, the system 10 to integrate data from one application to another application enables seamless data transfer from between two applications for a business owner. Source application 60 may be located in the cloud and target application 70 may be located on premise. The source application 60 and target application 70 may be from two different application vendors. For end-to-end visibility, the system 10 provides a clear data transportation channel.

The plurality of subsystems initially captures details about source application 60 and target application 70 as provided by a handler of the company, through a command capturing subsystem 20. The plurality of subsystems then via an application integration subsystem 30 analyses the handler provided details. The analysis is based on details such as both provided application authentication method, object name, token key and credentials.

After analysis, the plurality of subsystems may trigger both source application 60 and target application 70 for a response. The response may be used to extract the source application attributes and the target application attributes. Specifically, the application attributes include both application asset ID, cost centre, both application status, both application owner details and the like.

The plurality of subsystems further through an application attribute mapping subsystem 40, generate an application attribute map from the source application attributes and the target application attributes by implementation of artificial intelligence-based Natural Language Processing (NLP) algorithms. The generated attribute map represents a dynamic relation between the source application 60 and the target application 70. By such map, the plurality of subsystems establishes data transmission channel between the source application 60 and target application 70. The channel enables seamless transfer of data.

Furthermore, the plurality of subsystems also enables easy detection of handling of anomalies during the transfer. An exception handling subsystem 50 detect anomaly in the transmitted data and display detected anomaly in the form of a data transmission report on a user or handler interface of the device. The data transmission report may be in the form of any presentable format. Lastly, the handler may start, stop or pause the data transmission by a dashboard subsystem 80.

The user command capturing subsystem 20, the application integration subsystem 30, the application attribute mapping subsystem 40 and the exception handling subsystem 50 in FIG. 2 is substantially equivalent to the user command capturing subsystem 20, the application integration subsystem 30, the application attribute mapping subsystem 40 and the exception handling subsystem 50 of FIG. 1.

FIG. 3 is a tabular column illustrating an attribute mapping process 41 in accordance with an embodiment of the present disclosure. For example, a system A (source) and corresponding list of attributes are stated on column A 42. Similarly, for the same example a system B (target) with and corresponding list of attributes are stated column B 43. The application integration subsystem 30 will generate an automated mapping column 44 ("match the following") between two system (A & B).

Figure 4:
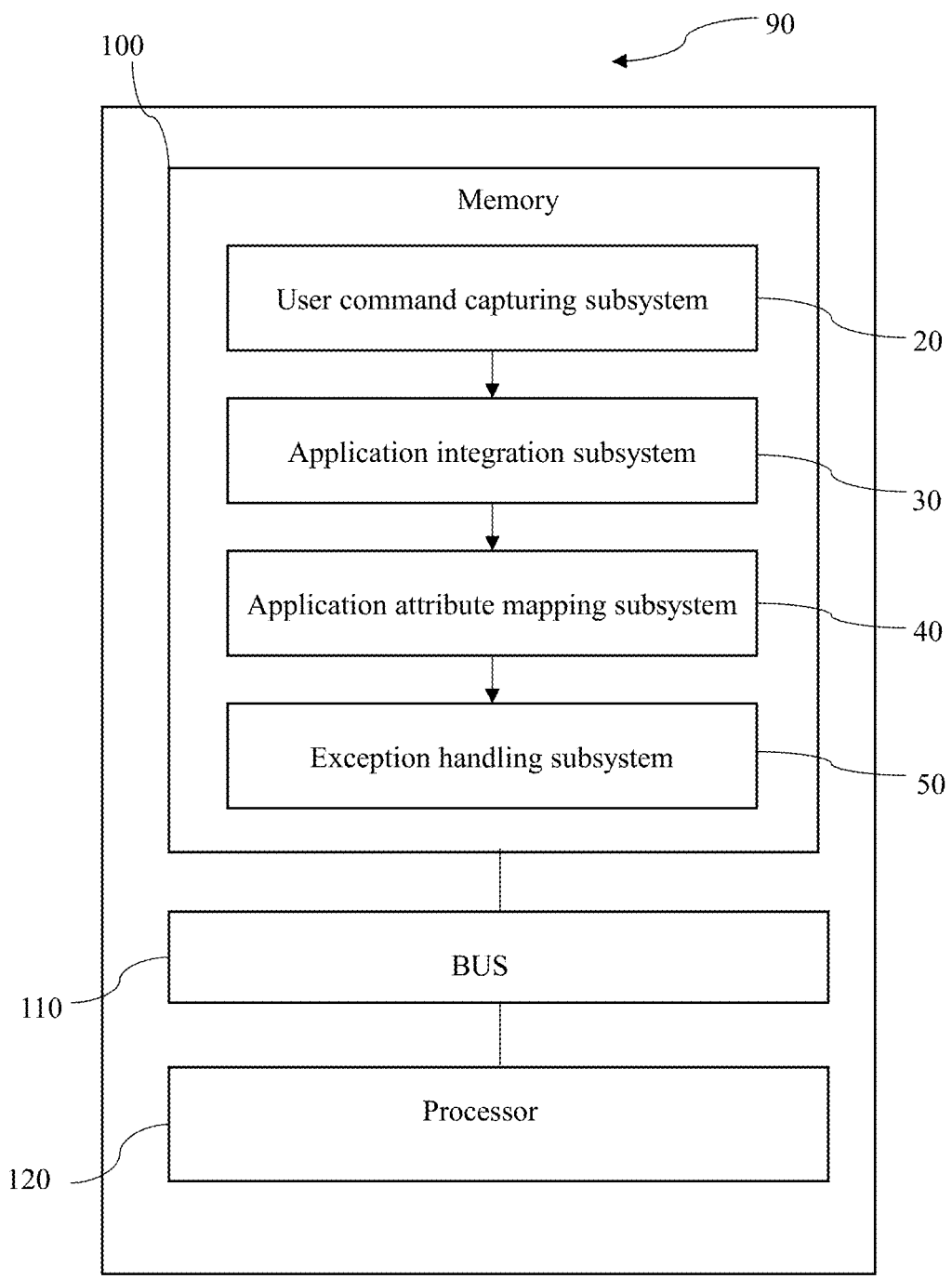
FIG. 4 is a block diagram illustrating a component in the computing system, such as those shown in FIG. 1, in accordance with an embodiment of the present disclosure.

FIG. 4 is a block diagram illustrating various component in the computing system, such as those shown in FIG. 1, in accordance with an embodiment of the present disclosure.

The processor(s) 120, as used herein, means any type of computational circuit, such as, but not limited to, a microprocessor, a microcontroller, a complex instruction set computing microprocessor, a reduced instruction set computing microprocessor, a very long instruction word microprocessor, an explicitly parallel instruction computing microprocessor, a digital signal processor, or any other type of processing circuit, or a combination thereof. The memory 100 may be non-transitory volatile memory and non-volatile memory.

The memory 100 includes a plurality of subsystems stored in the form of executable program which instructs the processor 120 via bus 110 to perform the method steps illustrated in FIG. 1. The memory 100 has following subsystems: the user command capturing subsystem 20, the application integration subsystem 30, the application attribute mapping subsystem 40 and the exception handling subsystem 50.

The command capturing subsystem 20 is configured to capture commands from a user. The application integration subsystem 30 is configured to analyse the captured commands of the user corresponding to the source application and the target application based on a set of parameters. The application integration subsystem 30 is also configured to obtain a source response and a target response for each of the captured commands. The application integration subsystem 30 is also configured to extract source application attributes and target application attributes from the obtained source response and target response.

The application attribute mapping subsystem 40 is configured to generate an application attribute map from the source application attributes and the target application attributes by implementation of artificial intelligence-based Natural Language Processing (NLP) algorithms. The application attribute mapping subsystem 40 is also configured to establish a data transmission channel between the source application and the target application based on the generated application attribute map. The application attribute mapping subsystem 40 is also configured to transmit data through the data transmission channel.

The exception handling subsystem 50 is configured to detect anomaly in the transmitted data using machine learning algorithms. The exception handling subsystem 50 is also configured to display detected anomaly in the form of a data transmission report on a user interface of the device.

Computer memory elements may include any suitable memory device(s) for storing data and executable program, such as read only memory, random access memory, erasable programmable read only memory, electrically erasable programmable read only memory, hard drive, removable media drive for handling memory cards and the like. Embodiments of the present subject matter may be implemented in conjunction with program modules, including functions, procedures, data structures, and application programs, for performing tasks, or defining abstract data types or low-level hardware contexts. Executable program stored on any of the above-mentioned storage media may be executable by the processor(s) 120.

Figure 5:
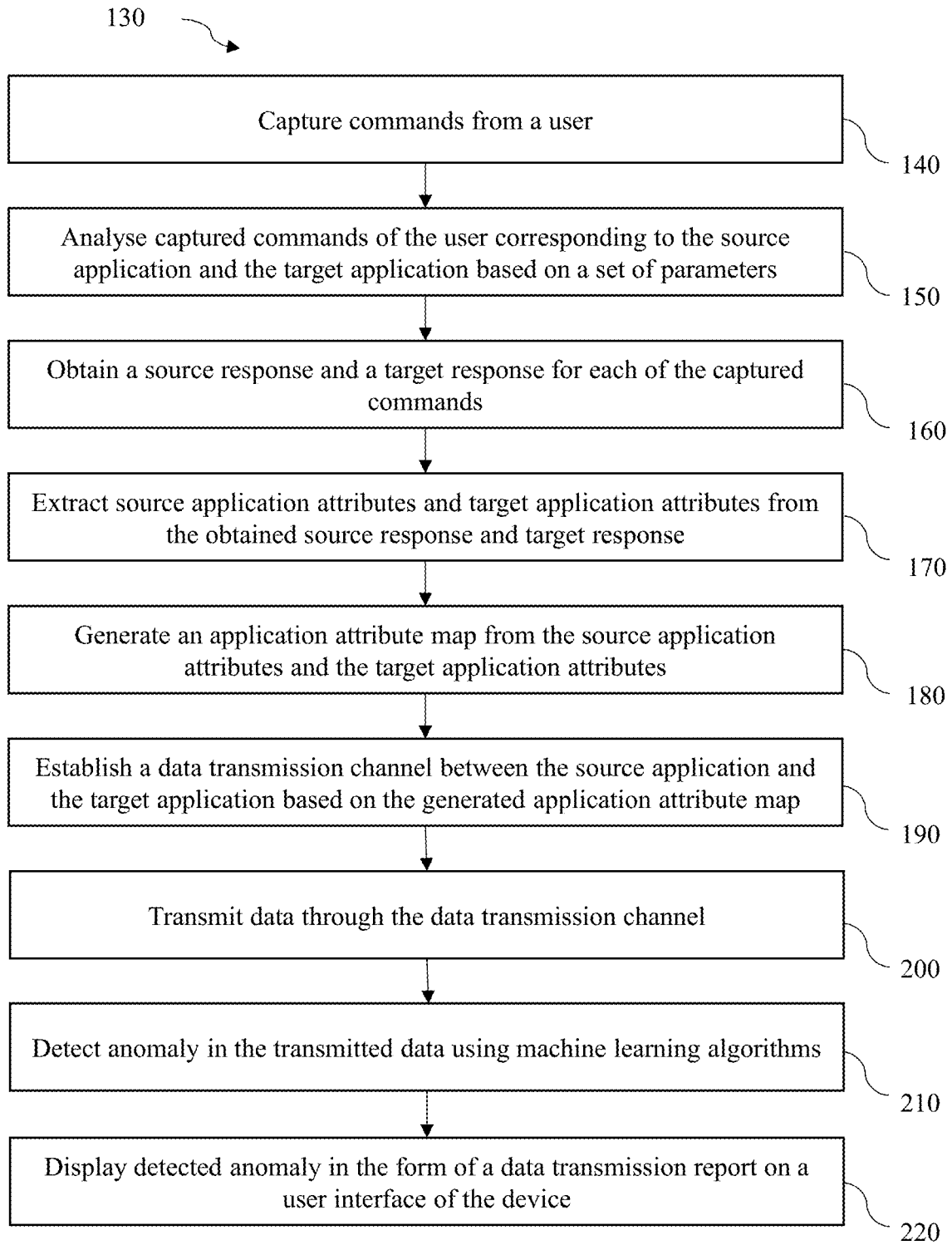
FIG. 5 is a process flowchart illustrating an exemplary method for integrating data from one application to another application in accordance with an embodiment of the present disclosure.

FIG. 5 is a process flowchart illustrating an exemplary method 130 for integrating data from one application to another application in accordance with an embodiment of the present disclosure.

At step 140, commands are captured from a user. In one aspect of the preferred embodiment, commands are captured from the user by a user command capturing subsystem. In another aspect of the preferred embodiment, the commands representative of source application 60 and target application 70 authentication process and credentials.

At step 150, captured commands of the user corresponding to the source application 60 and the target application 70 are analysed based on a set of parameters. In one aspect of the preferred embodiment, the captured commands of the user corresponding to the source application 60 and the target application 70 are analysed by an application integration subsystem. In another aspect of the preferred embodiment, the set of parameters comprises authentication method, application object name, token key and credentials.

At step 160, a source response and a target response are obtained for each of the captured commands. In one aspect of the preferred embodiment, the source response and the target response are obtained for each of the captured commands by the application integration subsystem. In another aspect of the preferred embodiment, the source response and the target response are obtained first by triggering the source application and the target application for response. And lastly by receiving the source response and the target response due to the trigger.

At step 170, source application 60 attributes and target application 70 attributes are extracted from the obtained source response and target response. In one aspect of the preferred embodiment, source application 60 attributes and target application 70 attributes are extracted from the obtained source response and target response by the application integration subsystem.

At step 180, an application attribute map is generated from the source application 60 attributes and the target application 70 attributes by implementation of artificial intelligence-based Natural Language Processing (NLP) algorithms. In one aspect of the preferred embodiment, the application attribute map is generated from the source 60 application attributes and the target application 70 attributes by an application attribute mapping subsystem. In another aspect of the preferent embodiment, the application attribute map is generated first by correlating the source application 60 attributes and the target application 70 attributes based on natural language processing rules and historical maps of existing applications. And thereby generating the application attribute map for the source application 60 and the target application 70.

At step 190, a data transmission channel is established between the source application 60 and the target application 70 based on the generated application attribute map. In one aspect of the preferred embodiment, a data transmission channel is established between the source application 60 and the target application 70 by the application attribute mapping subsystem.

At step 200, data is transmitted through the data transmission channel. In one aspect of the preferred embodiment, data is transmitted through the data transmission channel by the application attribute mapping subsystem.

At step 210, anomaly is detected in the transmitted data using machine learning algorithms. In one aspect of the preferred embodiment, the anomaly is detected in the transmitted data by an exception handling subsystem.

At step 220, detected anomaly is displayed in the form of a data transmission report on a user interface of the device. In one aspect of the preferred embodiment, the detected anomaly is displayed in the form of a data transmission report on a user interface of the device by the exception handling subsystem.

The method 130 further comprises controlling the functioning and the performance of the data transmission channel based on commands of the user. In one aspect of the preferred embodiment, controlling the functioning and the performance of the data transmission channel based on commands of the user by a dashboard subsystem.

Various embodiments of the present disclosure describe an automated system to integrate data from one application to another application. The system to integrate data from one application to another application describes steps to reduce the development time of integrations by more than 500%. The disclosed system to integrate data from one application to another application reduces dependency on human developer to write a program to integrate source and target applications. Instead, Bot driven integrations will auto generate code using machine learning algorithms. The integration will be error free and autonomous with no or low level of human intervention.

The figures and the foregoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, order of processes described herein may be changed and are not limited to the manner described herein. Moreover, the actions of any flow diagram need not be implemented in the order shown; nor do all of the acts need to be necessarily performed. Also, those acts that are not dependant on other acts may be performed in parallel with the other acts. The scope of embodiments is by no means limited by these specific examples.

We claim:

1. A system to integrate data from one application to another application, the system comprising:
   a hardware processor; and
   a memory coupled to the hardware processor, wherein the memory comprises a set of program instructions in the form of a plurality of subsystems, configured to be executed by the hardware processor, wherein the plurality of subsystems comprises:
   a user command capturing subsystem configured to capture commands from a user, wherein captured commands is associated with source application and target application;
   an application integration subsystem configured to:
      analyse the captured commands of the user corresponding to the source application and the target application based on a set of parameters;
      obtain a source response and a target response for each of the captured commands;
      extract source application attributes and target application attributes from the obtained source response and target response;
   an application attribute mapping subsystem configured to:
      generate an application attribute map from the source application attributes and the target application attributes by implementation of artificial intelligence-based Natural Language Processing (NLP) algorithms and assessing historical maps of existing applications, wherein the generated attribute map represents a dynamic relation between the source application and the target application; and
      establish a data transmission channel between the source application and the target application based on the generated application attribute map; and
      transmit data through the data transmission channel;
   an exception handling subsystem configured to
      detect anomaly in the transmitted data using machine learning algorithms based on time series data; and
      display detected anomaly in the form of a data transmission report on a user interface of the device.

2. The system of claim 1, wherein the commands from a user comprises commands representative of source and target application authentication process and credentials.

3. The system of claim 1, further comprising a virtual assistant bot configured to act as a communication interface between the source and target application and enable to establish the data communication channel.

4. The system of claim 1, wherein the set of parameters comprises authentication method, application object name, token key and credentials.

5. The system of claim 1, wherein to obtain the source response and the target response, the application integration subsystem is configured to:
   trigger the source application and the target application for response; and
   receive the source response and the target response due to the trigger.

6. The system of claim 1, wherein the commands of the user comprises voice commands and text input commands.

7. The system of claim 1, further comprises a dashboard subsystem configured to control functioning and performance of the data transmission channel based on commands of the user.

8. The system of claim 1, wherein the generation of the application attribute map comprises:
   correlation of the source application attributes and the target application attributes based on natural language processing rules and the historical maps of the existing applications; and
   generate the application attribute map for the source application and the target application.

9. A method for integrating data from one application to another application, the method comprising:
- capturing commands, by a processor, from a user;
- analysing, by the processor, captured commands of the user corresponding to the source application and the target application based on a set of parameters;
- obtaining, by the processor, a source response and a target response for each of the captured commands;
- extracting, by the processor, source application attributes and target application attributes from the obtained source response and target response;
- generating, by the processor, an application attribute map from the source application attributes and the target application attributes by implementation of artificial intelligence-based Natural Language Processing (NLP) algorithms and assessing historical maps of existing applications;
- establishing, by the processor, a data transmission channel between the source application and the target application based on the generated application attribute map;
- transmitting, by the processor, data through the data transmission channel;
- detecting, by the processor, anomaly in the transmitted data using machine learning algorithms based on time series data; and
- displaying, by the processor, detected anomaly in the form of a data transmission report on a user interface of the device.

10. The method of claim 9, wherein capturing, by the processor, the commands representative of source and target application authentication process and credentials.

11. The method of claim 9, wherein analysing, by the processor, based on a set of parameters comprising authentication method, application object name, token key and credentials.

12. The method of claim 9, wherein obtaining, by the processor, the source response and the target response comprises:
- triggering, by the processor, the source application and the target application for response; and
- receiving, by the processor, the source response and the target response due to the trigger.

13. The method of claim 9, further comprising controlling, by the processor, functioning and performance of the data transmission channel based on commands of the user.

14. The method of claim 9, wherein generating, by the processor, of the application attribute map comprises:
- correlating, by the processor, the source application attributes and the target application attributes based on natural language processing rules and the historical maps of the existing applications; and
- generating, by the processor, the application attribute map for the source application and the target application.

15. A non-transitory computer-readable storage medium having instructions stored therein that when executed by a hardware processor, cause the hardware processor to perform method steps comprising:
- capturing commands from a user;
- analysing captured commands of the user corresponding to the source application and the target application based on a set of parameters;
- obtaining a source response and a target response for each of the captured commands;
- extracting source application attributes and target application attributes from the obtained source response and target response;
- generating an application attribute map from the source application attributes and the target application attributes by implementation of artificial intelligence-based Natural Language Processing (NLP) algorithms and assessing historical maps of existing applications;
- establishing a data transmission channel between the source application and the target application based on the generated application attribute map;
- transmitting data through the data transmission channel;
- detecting anomaly in the transmitted data using machine learning algorithms based on time series data; and
- displaying detected anomaly in the form of a data transmission report on a user interface of the device.

* * * * *